United States Patent
Debnath et al.

(10) Patent No.: US 11,811,765 B1
(45) Date of Patent: Nov. 7, 2023

(54) MAXIMUM DEVICE ACCESS RESTRICTION AT AUTHENTICATOR LEVEL

(71) Applicant: Juniper Networks, Inc., Sunnyvale, CA (US)

(72) Inventors: Nandan Debnath, Bangalore (IN); Alfa Prakash Puhan, Bangalore (IN); Subha Sankar Mishra, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 198 days.

(21) Appl. No.: 16/836,733

(22) Filed: Mar. 31, 2020

(51) Int. Cl.
*H04L 29/06* (2006.01)
*H04L 9/40* (2022.01)

(52) U.S. Cl.
CPC ............ *H04L 63/10* (2013.01); *H04L 63/083* (2013.01); *H04L 63/0892* (2013.01); *H04L 63/1416* (2013.01)

(58) Field of Classification Search
CPC ..... H04L 63/10; H04L 63/08; H04L 63/0892; H04L 63/083; H04L 63/1416
See application file for complete search history.

(56) References Cited

U.S. PATENT DOCUMENTS

| | | | | |
|---|---|---|---|---|
| 6,035,404 A * | 3/2000 | Zhao | ..................... | H04L 63/102 709/225 |
| 6,668,283 B1 * | 12/2003 | Sitaraman | .......... | H04Q 11/0457 709/229 |
| 7,437,457 B1 * | 10/2008 | Eisendrath | .............. | H04L 63/10 709/204 |
| 8,756,708 B2 | 6/2014 | Zollinger et al. | | |
| 10,735,554 B1 * | 8/2020 | Jorgovanovic | ........ | H04L 65/612 |
| 2006/0109839 A1 * | 5/2006 | Hino | ...................... | H04L 63/083 370/352 |
| 2010/0199338 A1 * | 8/2010 | Craddock | ............... | G06F 21/31 726/7 |
| 2012/0192258 A1 * | 7/2012 | Spencer | .................. | H04W 8/18 726/7 |
| 2013/0042314 A1 * | 2/2013 | Kelley | .................. | H04L 9/3215 726/9 |
| 2013/0088956 A1 * | 4/2013 | Zhou | ..................... | H04W 28/02 370/230 |

(Continued)

OTHER PUBLICATIONS

Thanh A. Diep, Capacity of Multilevel Threshold Devices, Jan. 1998, IEEE, pp. 241-255. (Year: 1998).*

(Continued)

*Primary Examiner* — Jeffrey C Pwu
*Assistant Examiner* — Fahimeh Mohammadi
(74) *Attorney, Agent, or Firm* — Harrity & Harrity, LLP

(57) ABSTRACT

A network device may receive a request to access a network from a client device. The network device may determine that the client device is authenticated based on a set of authentication credentials obtained for the client device. The network device may determine, based on the client device being authenticated, that a quantity of devices currently accessing the network using the set of authentication credentials is equal to a maximum quantity of devices permitted to access the network using the set of authentication credentials. The network device may deny the client device access to the network based on the quantity of devices being equal to the maximum quantity of device.

20 Claims, 12 Drawing Sheets

(56) References Cited

U.S. PATENT DOCUMENTS

| | | | | |
|---|---|---|---|---|
| 2014/0020119 | A1* | 1/2014 | Zollinger | H04L 43/10 |
| | | | | 709/224 |
| 2014/0283120 | A1* | 9/2014 | Mao | G06F 21/6218 |
| | | | | 726/28 |
| 2014/0347987 | A1* | 11/2014 | Fang | H04W 28/0247 |
| | | | | 370/230 |
| 2015/0271102 | A1* | 9/2015 | Antich | H04L 47/805 |
| | | | | 370/230 |
| 2017/0048720 | A1* | 2/2017 | Smith | H04W 72/542 |
| 2018/0278607 | A1* | 9/2018 | Loladia | H04L 61/4588 |
| 2018/0332629 | A1* | 11/2018 | Huang | H04W 48/18 |
| 2021/0281576 | A1* | 9/2021 | Shravan | H04L 63/20 |

OTHER PUBLICATIONS

Sujit Biswas et al., A Scalable Blockchain Framework for Secure Transactions in IoT, Jun. 2019, IEEE, vol. 6, Issue: 3, pp. 4650-4659. (Year: 2019).*

Jeff Hayes, Policy-based Authentication and Authorization: Secure Access to the Network Infrastructur, Aug. 6, 2002, IEEE, pp. 328-333. (Year: 2002).*

Parikshit N. Mahalle, Identity Establishment and Capability Based Access Control (IECAC) Scheme for Internet of Things, Dec. 31, 2012, IEEE, pp. 187-191. (Year: 2012).*

* cited by examiner

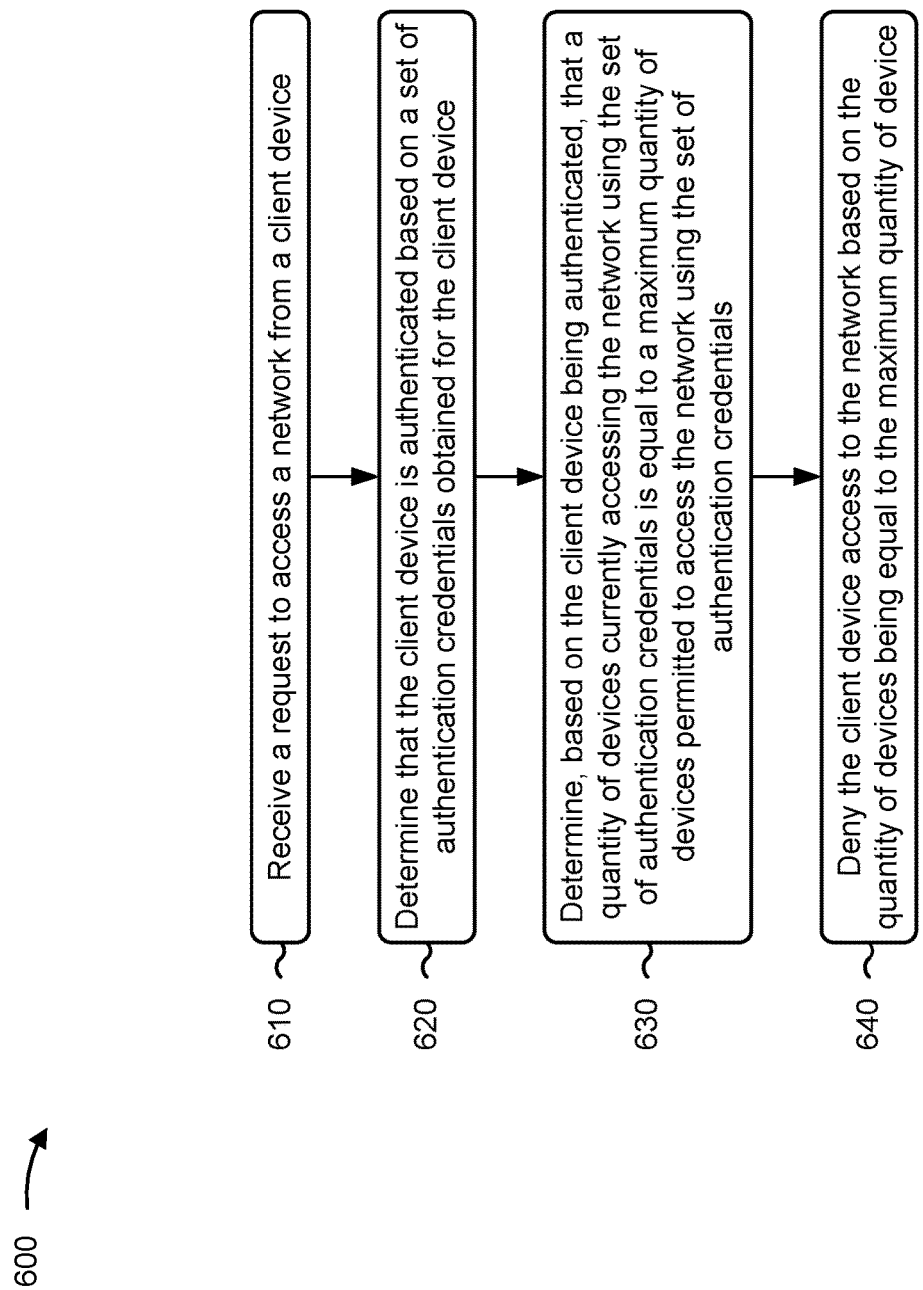

MAXIMUM DEVICE ACCESS RESTRICTION AT AUTHENTICATOR LEVEL

BACKGROUND

A network may include network devices that transfer or switch data, such as packets, between user devices connected to the network. A network device may also support an authentication method to facilitate authenticating a user device before granting the user device access to the network.

SUMMARY

According to some implementations, a method may include receiving, by a network device, a request to access a network from a client device; obtaining, by the network device, a set of authentication credentials for the client device based on receiving the request; determining, by the network device, that the client device is authenticated based on the set of authentication credentials; determining, by the network device and based on the client device being authenticated, a first quantity, wherein the first quantity is a maximum quantity of devices permitted to concurrently access the network utilizing the set of authentication credentials; determining, by the network device, a second quantity, wherein the second quantity is a quantity of client devices currently accessing the network utilizing the set of authentication credentials; determining, by the network device, whether the second quantity is less than the first quantity; and selectively permitting, by the network device, the client device access to the network based on whether the second quantity is less than the first quantity, wherein the client device is to be permitted access to the network when the second quantity is less than the first quantity, or wherein the client device is to be denied access to the network when the second quantity is not less than the first quantity.

According to some implementations, a network device may include one or more memories; and one or more processors to: receive a request to access a network from a first client device; determine that the first client device is authenticated based on a first set of authentication credentials obtained for the first client device; determine, based on the first client device being authenticated, that a quantity of devices currently accessing the network using the first set of credentials is less than a maximum quantity of devices permitted to access the network using the first set of credentials; grant the first client device access to the network based on the quantity of devices being less than the maximum quantity of devices; increase the quantity of devices, to form an increased quantity of devices, based on granting the first client device access to the network; receive a request to access a network from a second client device; receive the first set of authentication credentials from the second client device; determine that the second client device is authenticated based on the first set of authentication credentials; determine, based on the second client device being authenticated, that the increased quantity of devices currently accessing the network using the first set of credentials is equal to the maximum quantity of devices permitted to access the network using the first set of credentials; and deny the second client device access to the network based on the increased quantity being equal to the maximum quantity.

According to some implementations, a non-transitory computer-readable medium may store one or more instructions. The one or more instructions, when executed by one or more processors of a network device, may cause the one or more processors to: receive a request to access a network from a client device; determine that the client device is authenticated based on a set of authentication credentials obtained for the client device; determine, based on the client device being authenticated, that a quantity of devices currently accessing the network using the set of authentication credentials is equal to a maximum quantity of devices permitted to access the network using the set of authentication credentials; and deny the client device access to the network based on the quantity of devices being equal to the maximum quantity of device.

BRIEF DESCRIPTION OF THE DRAWINGS

FIGS. 4-6 are flowcharts of example processes for controlling access to a network based on a maximum device restriction.

DETAILED DESCRIPTION

Figure 1A:
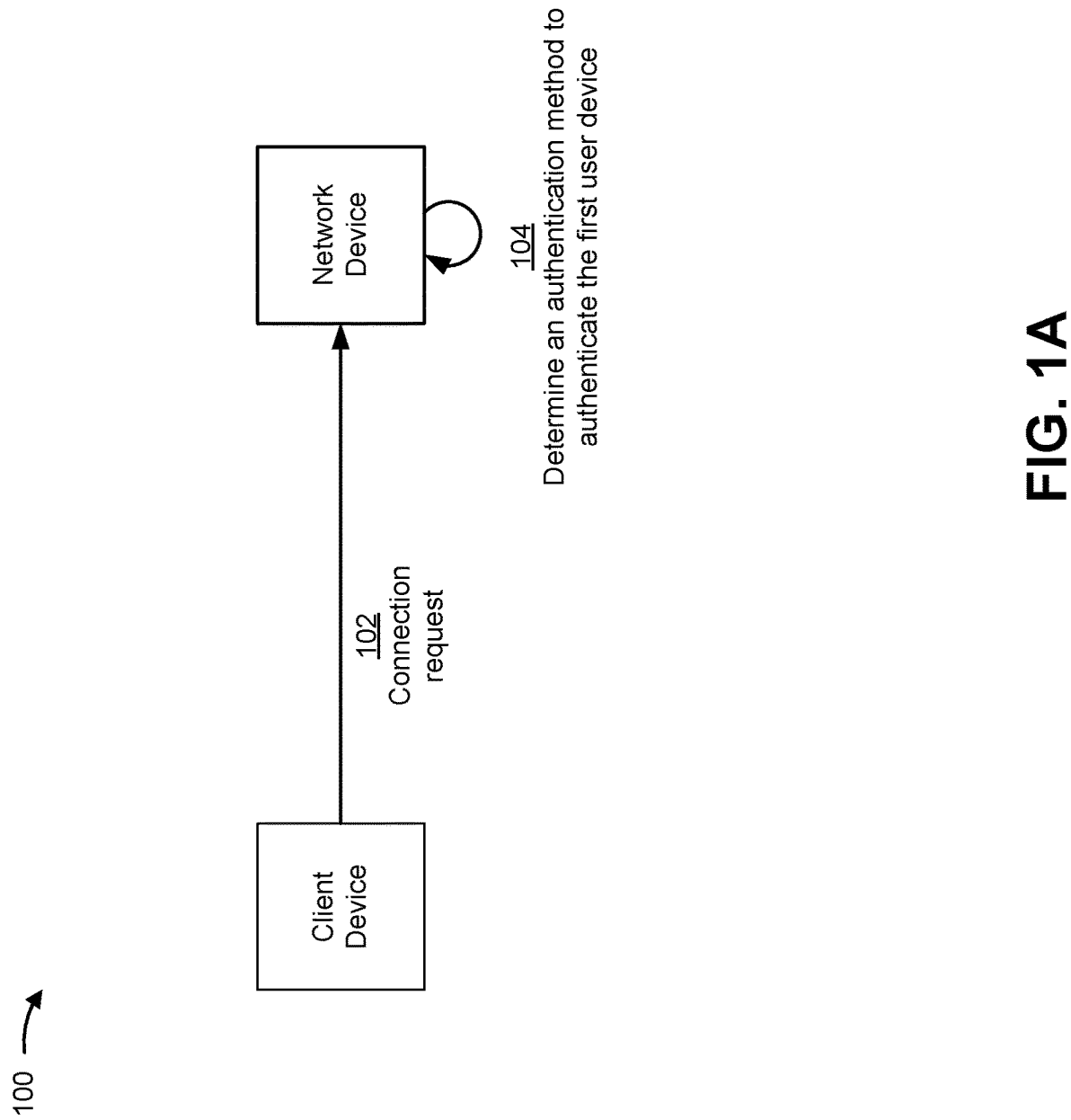
FIGS. 1A-1F are diagrams of one or more example implementations described herein.

The following detailed description of example implementations refers to the accompanying drawings. The same reference numbers in different drawings may identify the same or similar elements.

A client device may attempt to access a network by connecting to a network device included in the network. In many cases, the network device may attempt to authenticate the client device to ensure that access to the network is granted to only authorized devices. The network device may be able to use one or more authentication methods (e.g., a web-based authentication method, an Institute of Electrical and Electronics Engineers (IEEE) 802.1x authentication method, and/or the like) to authenticate the client device. However, the authentication method may authenticate multiple client devices using the same set of authentication credentials. Therefore, multiple client devices can utilize the same set of authentication credentials to concurrently access a network.

Allowing multiple client devices to utilize the same set of authorization credentials to concurrently access a network may make it more difficult to detect an unauthorized user, thereby making the network less secure. For example, when two client devices concurrently access a network using the same set of authentication credentials, a network device is unable to determine whether a user associated with the set of authentication credentials is using multiple client devices to access the network or whether the set of authentication credentials has been compromised and one of the client devices has fraudulently used the set of authentication credentials to access the network.

Some implementations described herein allow a network device to limit the number of devices that can concurrently access a network using the same set of authorization credentials by implementing a maximum device restriction. In some implementations, a maximum device restriction may be associated with a set of authorization credentials. The maximum device restriction may indicate a maximum number of client devices that can concurrently access a network utilizing a single set of authorization credentials. After authenticating a client device based on a set of authorization credentials, a network device may determine whether a quantity of client devices currently accessing a network is less than the maximum number of client devices permitted to concurrently access the network using the set of authorization credentials. If the quantity is less than the maximum number, the client device may be granted access to the network. Otherwise, access the client device may be denied access to the network.

In this way, a network can be made more secure. For example, the maximum device restriction may be set to 1. When a client device attempts to access a network utilizing a set of credentials utilized by a client device currently accessing the network, access to the network can be denied and an alert can be generated to determine if one of the client devices is associated with an unauthorized user and/or if the set of authentication credentials has been compromised.

FIGS. 1A-1F are diagrams of one or more example implementations 100 described herein. As shown in FIGS. 1A-1F, example implementation(s) 100 may include a network device, a client device, and/or a server device. The network device may include various types of devices, such as a router, a gateway, a switch, a bridge, a wireless access point, a base station, a firewall, and/or the like. In some implementations, the network device may comprise an access switch configured as an authenticator for devices attempting to connect to the network. The network device may include one or more ports for communicating with the client device and/or the server device. The network device may be included in a network, such as a cellular network, a local area network (LAN), a core network, an access network, a wide area network (WAN) such as the Internet, a cloud network, and/or the like.

As shown in FIG. 1A, and by reference number 102, the network device may receive a connection request from the client device. The client device may comprise an 801.1x client device (supplicant), a captive-portal client device, a MAC-radius client device, and/or the like. The network device may receive the connection request from the client device via a port of the one or more ports of the network device. For example, the client device may connect to the port and send a transmission control protocol or internet protocol (TCP/IP) connection request to the network device (e.g., to access the network). The connection request may include a media access control (MAC) address associated with the client device, an IP address associated with the client device, a device identifier associated with the client device, information associated with a user of the client device (e.g., a username), and/or the like.

In some implementations, as shown in FIG. 1A, and by reference number 104, the network device determines an authentication method to be used by the network device to authenticate the client device. For example, the network device may determine a default authentication method (sometimes referred to as an initial authentication method) from a data structure, such as a database. The network device may select the default authentication method as the authentication method to be used by the network device to authenticate the client device.

In some implementations, the authentication method is a web-based authentication method (e.g., a captive portal web-based authentication method), an Institute of Electrical and Electronics Engineers (IEEE) 802.1x authentication method (e.g., an extensible authentication protocol over local area network (EAPoL) authentication method), a MAC-based authentication method (e.g., a MAC authentication bypass (MAB) authentication method, a MAC-radius authentication method, and/or the like), and/or the like.

In some implementations, the network device determines the authentication method based on a type of the client device. For example, the connection request may include information identifying a MAC address associated with the client device. The network device may determine a manufacturer of the client device based on the MAC address. The network device may determine the type of the client device based on the manufacturer. In some implementations, the network device may determine the type of the client device in another way and/or based on another type of information. For example, the network device may access stored information that identifies the type of the client device. The network device may determine the authentication method based on the type of the client device.

In some implementations, the network device determines the authentication method based on a type of connection (e.g., a wired connection, a wireless connection, and/or the like) used to communicate with the network device. For example, the network device may select a first authentication method when the client device communicates with the network device via a wired connection (e.g., an Ethernet connection, a fiber optic connection, and/or the like) and may select a second, different authentication method when the client device communicates with the network device via a wireless connection.

In some implementations, the network device determines the authentication method based on a type of communication protocol (e.g., TCP/IP, hyper text transfer protocol (HTTP), and/or the like) used to communicate with the network device. For example, the network device may select a first authentication method when the client device uses TCP/IP to communicate with the network device and may select a second, different authentication method when the client device uses HTTP to communicate with the network device.

In some implementations, the network device determines the authentication method based on a location of the client device. For example, the connection request may include information identifying an IP address of the client device. The network device may determine the location of the client device based on the IP address. The network device may determine whether the location of the client device is a location from which the client device commonly accesses the network (e.g., a home or place of work of a user associated with the set of authentication credentials). The network device may select a more robust, complex, and/or secure authentication method (e.g., two-factor authentication) when the location of the client device is not a location from which the client device commonly accesses the network relative to an authentication method (e.g., single factor authentication) selected when the location of the client device is a location from which the commonly accesses the network.

In some implementations, the network device determines the authentication method based on a frequency at which the client device accesses the network. For example, the network device may determine a quantity of times the client device has accessed the network within the past 24 hours, 48 hours, week, month, year, and/or the like. The network device may determine whether the quantity of times satisfies a threshold quantity. The network device may select a more robust, complex, and/or secure authentication method when the quantity of times satisfies the threshold relative to an authentication method selected when the quantity does not satisfy the threshold.

In some implementations, the network device determines the authentication method based on an authentication history of the client device. For example, the network device may process (e.g., parse) the connection request to determine identification information concerning the client device, such as the MAC address associated with the client device, the IP address associated with the client device, a device identifier associated with the client device, the information associated with the user of the client device, and/or the like. The network device may query, based on the identification information, a data structure for the information related the authentication history of the client device. The data structure may be included in the network device or may be accessible to the network device via a network. The information related to the authentication history of the client device may indicate and/or identify whether the network device, or a different device (e.g., a different network device), has previously authenticated the client device and may indicate and/or identify a previously used authentication method that was used (e.g., by the network device or the different device) to authenticate the client device.

In some implementations, the network device selects the previously used authentication method as the authentication method for authenticating the client device. For example, the network device may determine that the client device has been, or has not been, successfully authenticated using the previously used authentication method. The network device may select the previously used authentication method based on the client device having been, or not having been, successfully authenticated using the previously used authentication method.

In some implementations, the network device selects an authentication method other than the previously used authentication method as the authentication method for authenticating the client device. For example, the network device may determine that the client device has been, or has not been, successfully authenticated using the previously used authentication method. The network device may select an authentication method other than the previously used authentication method based on the client device having been, or not having been, successfully authenticated using the previously used authentication method.

In some implementations, the network device determines the authentication method based on a single one of the factors identified above or another factor that might be useful in determining the authentication method to use for a particular client device. In some implementations, the network device determines the authentication method based on a combination of the factors identified above and/or one or more other factors that might be useful in determining the authentication method to use for a particular client device. The network device may determine a respective score based on each of a plurality of factors and determine a total score as a function of the respective scores, such as a weighted combination of the respective scores. The network device may determine the authentication method based on the total score.

In some implementations, the network device utilizes a machine learning model to determine the authentication method. The machine learning model may be trained by a machine learning system using a set of observations. The set of observations may be obtained and/or input from historical data, such as data gathered during one or more processes described herein. For example, the set of observations may include data gathered from authentication methods used by the network device (and/or one or more other network devices) to authenticate client devices accessing the network.

A feature set may be derived from the set of observations. The feature set may include a set of variable types. A variable type may be referred to as a feature. A specific observation may include a set of variable values corresponding to the set of variable types. A set of variable values may be specific to an observation. In some cases, different observations may be associated with different sets of variable values, sometimes referred to as feature values. In some implementations, the machine learning system may determine variable values for a specific observation based on input received from the network device. For example, the machine learning system may identify a feature set (e.g., one or more features and/or corresponding feature values) from structured data input to the machine learning system, such as by extracting data from a particular column of a table, extracting data from a particular field of a form, extracting data from a particular field of a message, extracting data received in a structured data format, and/or the like.

As an example, a feature set for a set of observations may include a first feature of a type of a client device attempting to access a network, a second feature of an authentication method used to authenticate the client device, a third feature of a MAC or IP address of the client device, a fourth feature of a type of connection used to connect to the network device (e.g., wired, wireless, Ethernet, and/or the like), a fifth feature of a physical location of the client device, a sixth feature of a number of times the client device, a user associated with the client device, and/or a user associated with a set of authentication credentials has attempted to access the network, and/or the like.

The set of observations may be associated with a target variable type. The target variable type may represent a variable having a numeric value (e.g., an integer value, a floating point value, and/or the like), may represent a variable having a numeric value that falls within a range of values or has some discrete possible values, may represent a variable that is selectable from one of multiple options (e.g., one of multiples classes, classifications, labels, and/or the like), may represent a variable having a Boolean value (e.g., 0 or 1, True or False, Yes or No), and/or the like. A target variable type may be associated with a target variable value, and a target variable value may be specific to an observation. In some cases, different observations may be associated with different target variable values.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model, a predictive model, and/or the like. When the target variable type is associated with continuous target variable values (e.g., a range of numbers and/or the like), the machine learning model may employ a regression technique. When the target variable type is associated with categorical target variable values (e.g., classes, labels, and/or the like), the machine learning model may employ a classification technique.

In some implementations, the machine learning model is trained on a set of observations that do not include a target variable (or that include a target variable, but the machine learning model is not being executed to predict the target variable). This may be referred to as an unsupervised learning model, an automated data analysis model, an automated signal extraction model, and/or the like. In this case, the machine learning model may learn patterns from the set of observations without labeling or supervision, and may provide output that indicates such patterns, such as by using clustering and/or association to identify related groups of items within the set of observations.

In some implementations, the machine learning system partitions the set of observations into a training set that includes a first subset of observations, of the set of observations, and a test set that includes a second subset of observations of the set of observations. The training set may be used to train (e.g., fit, tune, and/or the like) the machine learning model, while the test set may be used to evaluate a machine learning model that is trained using the training set. For example, for supervised learning, the training set may be used for initial model training using the first subset of observations, and the test set may be used to test whether the trained model accurately predicts target variables in the second subset of observations.

In some implementations, the trained machine learning model is applied to a new observation. The new observation may be input to a machine learning system that stores the trained machine learning model. The new observation may include a first feature of a type of a client device attempting to access a network, a second feature of an authentication method used to authenticate the client device, a third feature of a MAC or IP address of the client device, a fourth feature of a type of connection used to connect to the network device (e.g., wired, wireless, Ethernet, and/or the like), a fifth feature of a physical location of the client device, a sixth feature of a number of times the client device, a user associated with the client device, and/or a user associated with a set of authentication credentials has attempted to access the network, and/or the like.

In some implementations, the machine learning system applies the trained machine learning model to the new to generate an output (e.g., a result). In some implementations, the output is a score for each of a plurality of authentication methods. The score indicates a relative ranking of each authentication method relative to the other authentication methods with respect to be selected as the authentication method used to authenticate the client device. Alternatively, and/or additionally, the output may be information identifying an authentication method to be used to authenticate the client device. The machine learning system provides the output to the network device. The network device may determine the authentication method based on the output received from the machine learning system.

In this way, the machine learning system may apply a rigorous and automated process to determining an authentication method to be used to authenticate a client device. The machine learning system enables recognition and/or identification of tens, hundreds, thousands, or millions of features and/or feature values for tens, hundreds, thousands, or millions of observations, thereby increasing an accuracy and consistency of determining an authentication method to be used to authenticate a client device relative to requiring computing resources to be allocated for tens, hundreds, or thousands of operators to manually determining an authentication method to be used to authenticate a client device using the features or feature values.

In some implementations, the machine learning system is implemented by the network device. In some implementations, the machine learning system is implemented by a device that is separate from the network device, such as a server device or a cloud computing platform.

In some implementations, the network device may communicate, based on the authentication method, with the client device and/or the server device to attempt to authenticate the client device, as described herein.

Figure 1B:
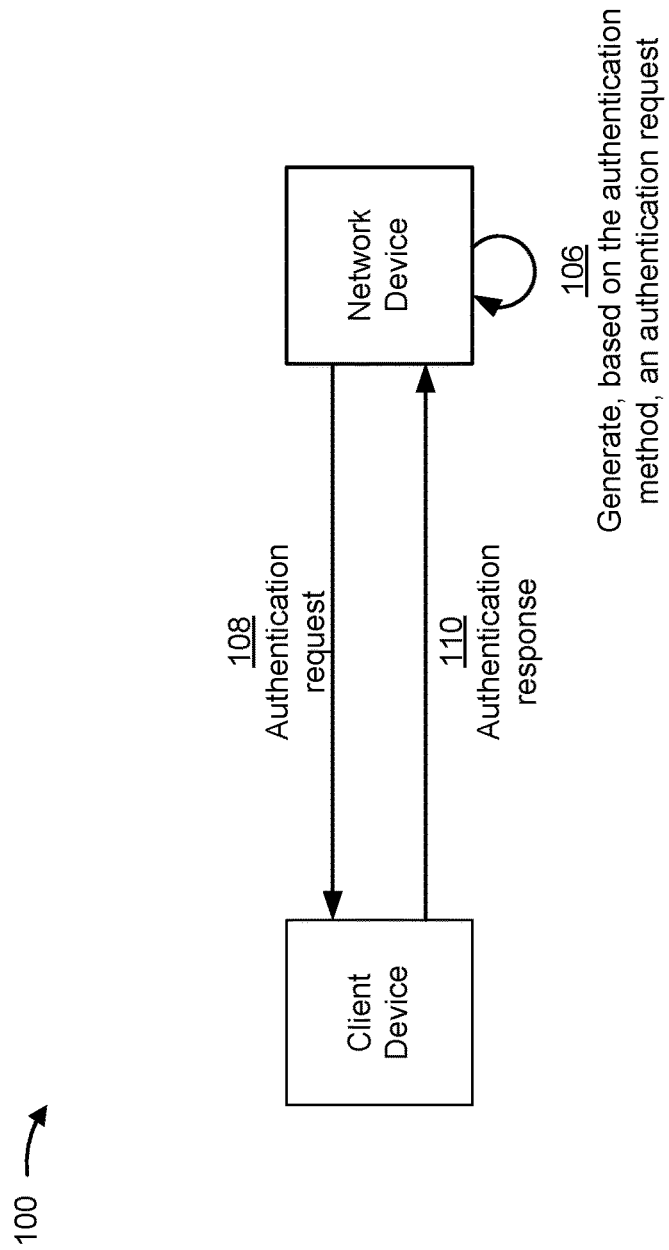

In some implementations, as shown in FIG. 1B, and by reference number 106, the network device generates an authentication request (e.g., based on the authentication method). For example, when the authentication method is a captive portal web-based authentication method, the authentication request may be a captive portal authentication request. As another example, when the authentication method is an EAPoL authentication method, the authentication request may be an EAPoL authentication request. The authentication request may be a request for a set of authentication credentials of the client device and/or of a user of the client device.

As shown in FIG. 1B, and by reference number 108, the network device may send the authentication request to the client device via the port of the network device. As shown by reference number 110, the network device may receive, after sending the authentication request and via the port of the network device, an authentication response from the client device. The authentication response may include the set of authentication credentials of the client device and/or of the user of the client device. The set of authentication credentials may include a username and/or password associated with the user of the client device, a security certificate, a security token, a biometric, and/or another type of authentication credential.

Alternatively, and/or additionally, the network device may obtain the set of authentication credentials from another device. For example, the network device may access a user account associated with the client device based on a username included in the connection request and/or the authentication response. The network device may obtain one or more portions of the set of authentication credentials based on information included in the user account. In some implementations, the information included in the user account may include a security certificate, a password, a token, a biometric, and/or the like. In this case, the network device may generate the set of authentication credentials based on information received from the client device and based on information obtained from another source, such as a user account.

Figure 1C:
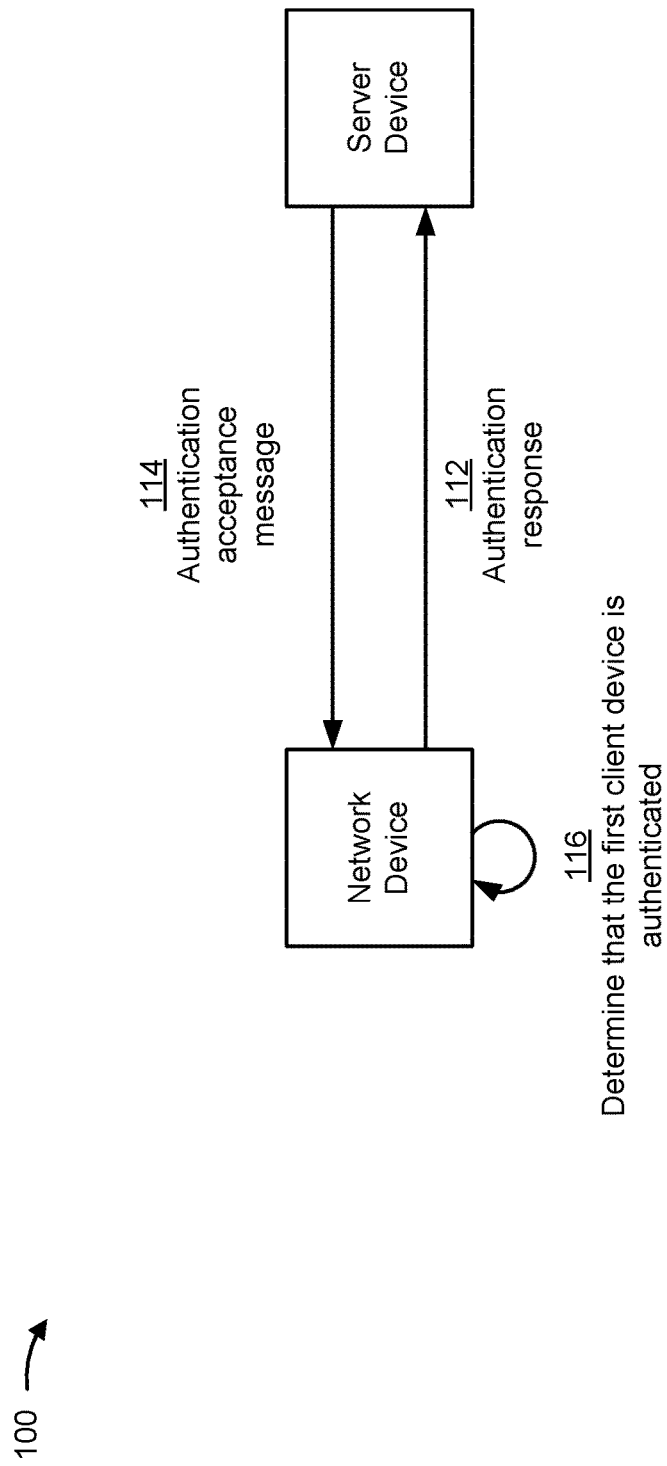

As shown in FIG. 1C, and by reference number 112, the network device may send the authentication response to the server device. The server device may be an authentication server device, such as an authentication, authorization, and accounting (AAA) server device, a remote authentication dial in user service (RADIUS) server device, and/or a similar device, that processes the authentication response to determine whether the authentication credentials are accepted or rejected. In some implementations, the network device may simply forward the authentication response, received from the client device, to the server device. In some implementations, such as where the network device generates the set of authentication credentials, the network device may generate the authentication response, to send to the server device, based on the set of authentication credentials that the network device generated. In some implementations, such as where the network device generates the set of authentication credentials, the network device may update or replace the set of authentication credentials, included in the authentication response, with the set of authentication credentials that the network device generated.

As shown in FIG. 1C, and by reference number 114, the network device receives, after sending the authentication response, an authentication acceptance message from the server device. In some implementations, the authentication acceptance message includes information indicating that the set of authentication credentials are accepted (e.g., that an authentication process has been successfully performed using the set of authentication credentials). As shown by reference number 116, the network device determines that the client device is authenticated based on the authentication acceptance message received from the server device.

While not shown in FIG. 1C, it is possible that the server device determines that the set of authentication credentials are not accepted (e.g., that an authentication process has not been successfully performed using the set of authentication credentials). In this case, the server device may send an authentication denied message to the network device to inform the network device to deny the client device access to the network. Based on the authentication denied message, the network device determines that the client device is not authenticated.

In some implementations, the network device transmits information to the client device indicating that the client device was not authenticated, that the set of authentication credentials are not valid, and/or the like. In some implementations, the network device may request a new set of authentication credentials from the client device and may attempt to authenticate the client device based on the new set of authentication credentials in a manner similar to that described above.

The description that follows assumes that the client device was successfully authenticated by the server device.

Figure 1D:
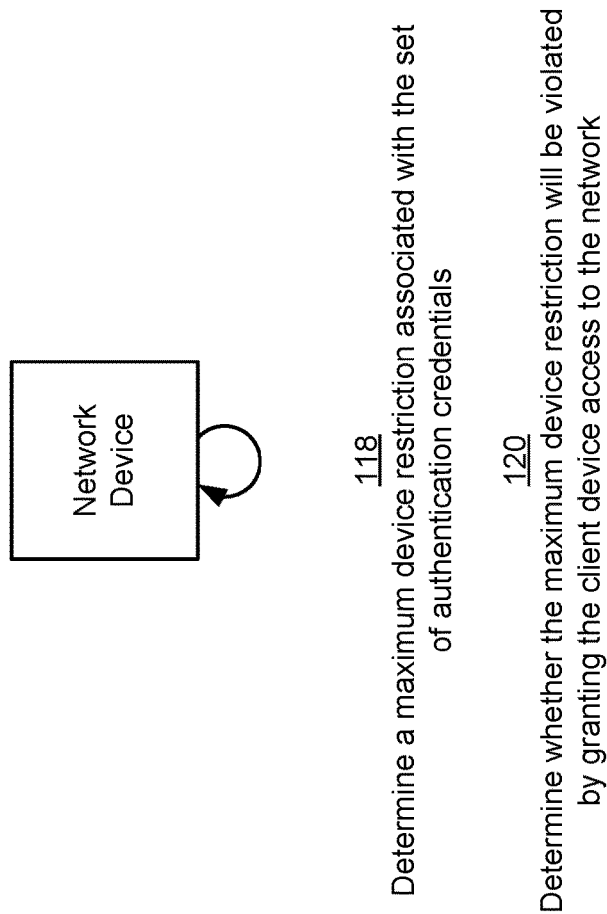

In some implementations, as shown in FIG. 1D, and by reference number 118, the network device determines a maximum device restriction associated with the set of authentication credentials based on the client device being authenticated. In some implementations, the maximum device restriction indicates a maximum quantity of devices, of any type, that may concurrently access the network utilizing the same set of authentication credentials (e.g., a same username and password, a same security certificate, and/or the like).

Alternatively, and/or additionally, the maximum device restriction indicates a maximum quantity of a type of device that may concurrently access the network utilizing the same set of authentication credentials. For example, the maximum device restriction may indicate a maximum quantity of computing devices (e.g., desktop computers, laptop computers, and/or the like), mobile devices (e.g., smart phones, tablets, and/or the like), peripheral devices (e.g., printers, data storage devices, and/or the like), and/or one or more other types of devices that may concurrently access the network utilizing the same set of authentication credentials.

For example, a particular authentication method may be used to authenticate a particular type of device. Performing the particular authentication method may require more computing resources (e.g., processing resources, memory resources, communication resources, and/or the like) that performing other types of authentication methods. By restricting a quantity of the particular type of device that may concurrently access a network utilizing the same set of authentication credentials, the network device may limit a number of times that the particular authentication method is performed by the network device, which may conserve computing resources.

In some implementations, the network device determines the maximum device restriction based on the authentication acceptance message. For example, the authentication acceptance message may include information identifying the maximum device restriction. Alternatively, and/or additionally, the network device determines the maximum device restriction based on a vendor specific attribute (VSA). For example, the authentication message may include a VSA indicating the maximum device restriction.

In some implementations, the network device determines the maximum device restriction based on information stored in a memory associated with the network device. For example, the network device may maintain a data structure (e.g., a database) storing information associating sets of authentication credentials (or information included in or otherwise associated with sets of authentication credentials) with maximum device restrictions. The network device may access the data structure and may determine the maximum device restriction based on the set of authentication credentials (or the information included in or otherwise associated with sets of authentication credentials).

In some implementations, as shown in FIG. 1D, and by reference number 120, the network device determines whether the maximum device restriction will be violated by granting the client device access to the network. The network device grants or denies the client device access to the network based on whether the maximum device restriction will be violated by granting the client device access to the network, as discussed below in connection with FIGS. 1E and 1F.

In some implementations, the maximum device restriction indicates a maximum quantity of devices, of any type, that can concurrently access the network using the same set of authentication credentials. In these implementations, the network device may determine a quantity of devices, of any type, that have been authenticated based on the set of authentication credentials and are currently accessing the network.

For example, the network device may maintain a data structure storing information identifying a set of authentication credentials used to authenticate each device currently accessing the network. Each set of authentication credentials may be associated with information identifying a quantity of devices that have been authenticated based on the set of authentication credentials and are currently accessing the network.

In some implementations, the information identifying the quantity of devices is an integer value (e.g., 0, 1, 2, and/or the like) corresponding to a quantity of devices that have been authenticated based on the set of authentication credentials and are currently accessing the network. The network device may access the data structure and determine the quantity of devices that have been authenticated based on the set of authentication credentials and are currently accessing the network based on the integer value associated with the set of authentication credentials.

Alternatively, and/or additionally, the information identifying the quantity of devices includes information identifying one or more devices that have been authenticated based on the set of authentication credentials and that are currently accessing the network, such as a media access control (MAC) address, an internet protocol (IP) address, and/or another type of information. The network device may access the data structure and determine the quantity of devices that have been authenticated based on the set of authentication credentials and are currently accessing the network based on a quantity of the one or more devices identified in the information identifying the quantity of devices.

In some implementations, the network device determines that information identifying the set of authentication credentials is not stored in the data structure. For example, prior to any device being authenticated based on the set of authentication credentials, the data structure may not contain information identifying the set of authentication credentials. The network device may cause a new entry to be created in the data structure based on a first device (e.g., the client device) being authenticated based on the set of authentication credentials. The new entry may include information identifying the set of authentication credentials. In these implementations, the network device determines the quantity of devices that have been authenticated based on the set of authentication credentials and are currently accessing the network is zero based on causing the new entry to be created in the data structure.

In some implementations, the maximum device restriction may be associated with a type of client device. In these implementations, the network device determines a type of the client device. For example, the connection request and/or the authentication response received from the client device may include information identifying a MAC address, an IP address, a device type, a device identifier, and/or other information useful for determining a type of the client device and the network device may determine a type of the client device based on the information included in the connection request and/or the authentication response. The network device may determine whether the maximum device restriction will be violated by granting the client device access to the network, as discussed below in connection with FIGS. 1E and 1F.

Figure 1E:
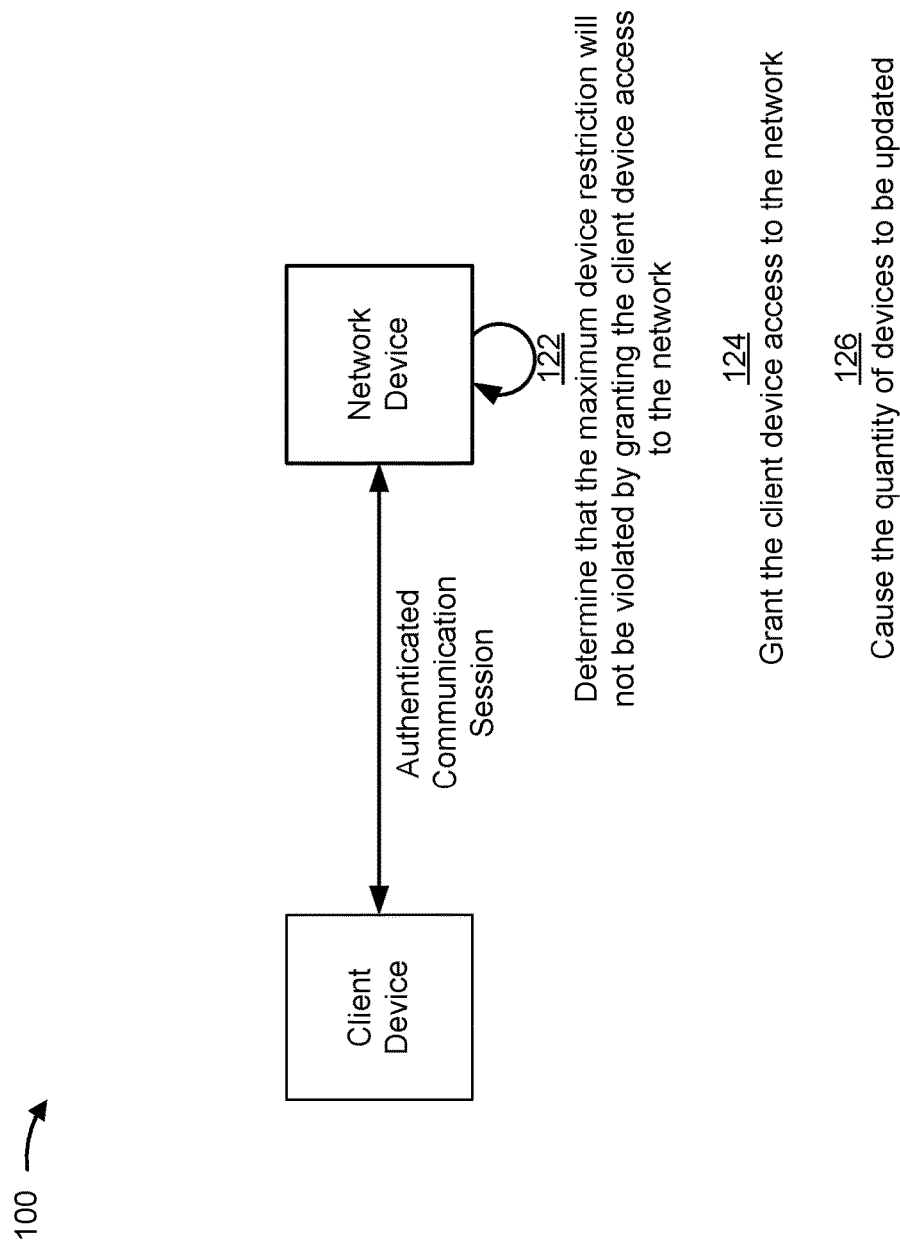

In some implementations, as shown in FIG. 1E, and by reference number 122, the network device determines that the maximum device restriction will not be violated by granting the client device access to the network. For example, the network device may determine that a quantity of devices that have been authenticated based on the set of authentication credentials and are currently accessing the network is less than a quantity of devices indicated by the maximum device restriction.

In these implementations, as shown by reference number 124, the network device grants the client device access to the network. As shown in FIG. 1E, the network device establishes an authenticated communication session with the client device based on granting the client device access to the network. The client device may receive a network address (e.g., an IP address) from a network protocol server, such as a Dynamic Host Configuration Protocol (DHCP) server, with a lease time (e.g., one hour, two hours, one day, two days, and/or the like) and the client device may be connected to the network during the lease time.

In some implementations, the network device maintains information relating to an authenticated communication session for the client device in a data structure. The network device also determines parameters of the authenticated communication session (e.g., a time of authentication, a MAC address of the client device) to associate with the authenticated communication session in the data structure (e.g., a filtering database, a forwarding database, a forwarding table, a MAC table, and/or the like).

As shown by reference number 126, the network device causes the information identifying the quantity of devices associated with the set of authentication credentials to be updated based on granting the client device access to the network. For example, the network device may access the data structure storing the sets of authentication credentials and modify the information identifying the quantity of devices associated with the set of authentication credentials utilized by the client device (e.g., increase a value of an integer included in the information identifying the quantity of devices by 1 and/or modify the information identifying the quantity of devices to include information identifying the client device).

After being granted access to the network, if the client device does not communicate via the network for a period of time (e.g., a MAC age-out time for the client device, a period of time corresponding to a session timeout, a period of time corresponding to an authentication timeout, and/or the like), the network device may terminate the authenticated communication session and may remove the authenticated communication session from the data structure. The network device may modify the information identifying the quantity of devices associated with the set of authentication credentials based on terminating the authenticated communication session and/or removing the authenticated client session from the data structure. For example, the network device may decrease a value of an integer stored in the information identifying the quantity of devices associated with the set of authentication credentials, remove information identifying the client device from the information identifying the quantity of devices associated with the set of authentication credentials, and/or modify the information identifying the quantity of device associated with the set of authentication credentials in some other way to indicate that the client device is no longer accessing the network.

Figure 1F:
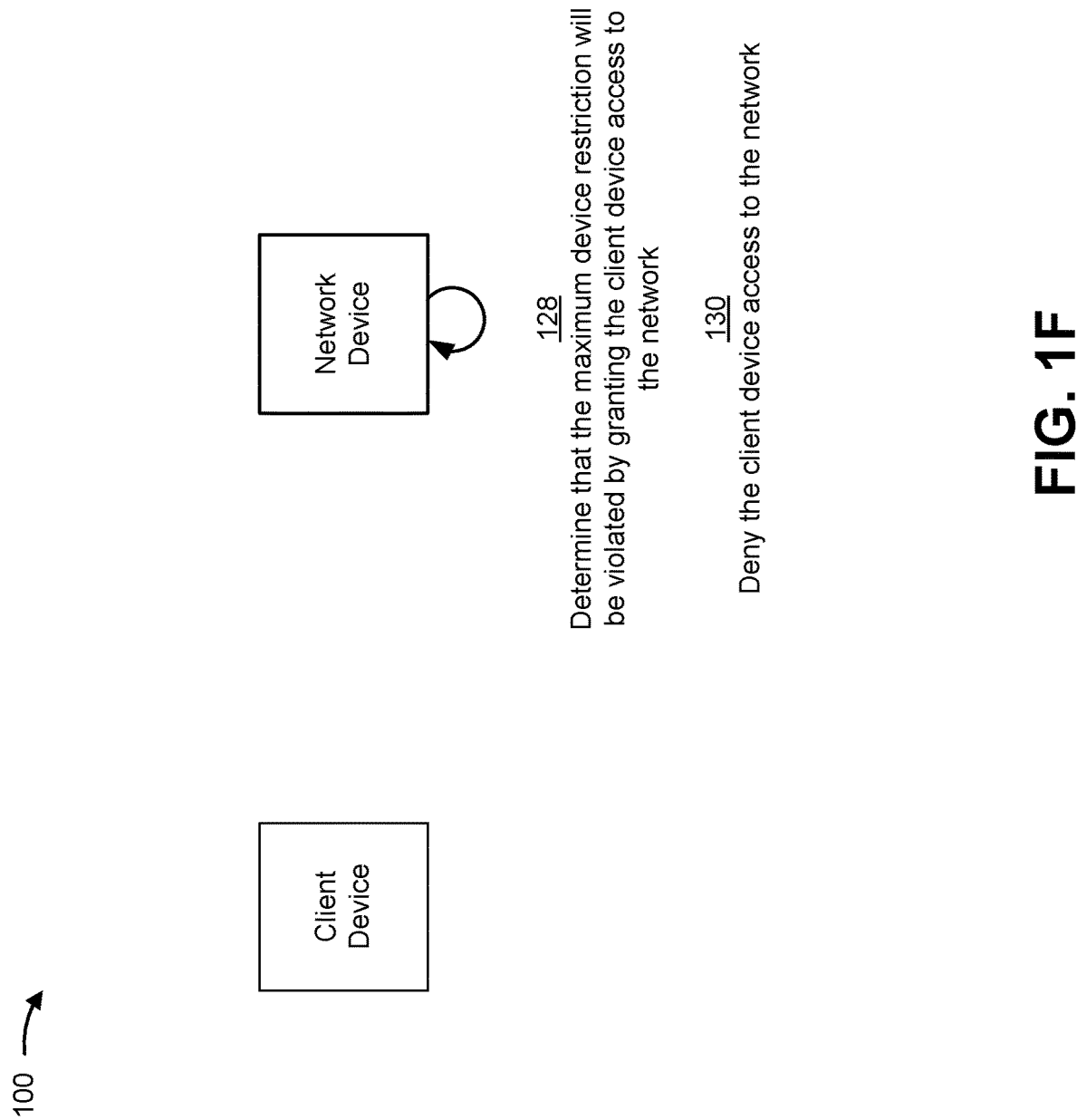

In some implementations, as shown in FIG. 1F, and by reference number 128, the network device determines that the maximum device restriction will be violated by granting the client device access to the network. For example, the network device may determine that a quantity of devices that have been authenticated based on the set of authentication credentials and are currently accessing the network is not less than a quantity of devices indicated by the maximum device restriction.

In these implementations, as shown by reference number 130, the network device denies the client device access to the network. For example, the network device may block or otherwise prevent data transmitted from the client device from being transmitted via the network. In some implementations, the network device terminates a communication session between the network device and the client device that was used to receive the set of authentication credentials based on denying the client device access to the network.

In some implementations, the network device transmits information to the client device indicating that the client device is denied access to the network, that a maximum quantity of devices are currently accessing the network using the set of authentication credentials, and/or the like. In some implementations, the network device may request a new set of authentication credentials from the client device and may attempt to authenticate the client device based on the new set of authentication credentials in a manner similar to that described above.

In some implementations, the network device may generate a security alert based on denying the client device access to the network. The security alert may be provided to a user associated with the set of authentication credentials, an administrator of the network, and/or another person and/or device responsible for security of the network. The security alert may allow the user associated with the set of authentication credentials and/or the administrator to determine whether the set of authentication credentials has been compromised (e.g., that an unauthorized person attempted to, or is currently accessing the network). In this way, the network may be kept more secure relative to networks that fail to limit a quantity of devices that can concurrently access a network utilizing the same set of authentication credentials.

As indicated above, FIGS. 1A-1F are provided merely as one or more examples. Other examples may differ from what is described with regard to FIGS. 1A-1F.

Figure 2:
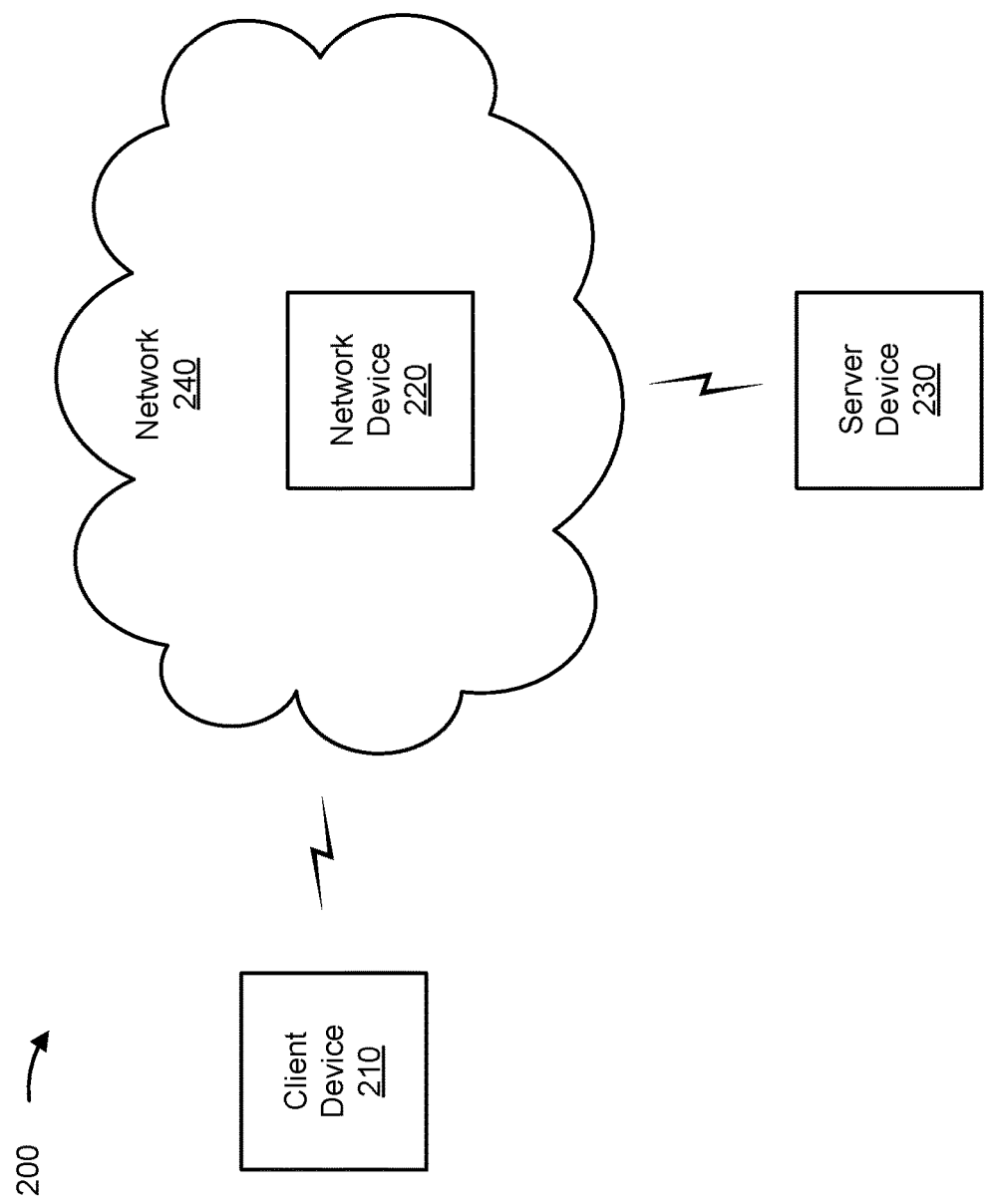
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a client device 210, a network device 220, a server device 230, and/or a network 240. Devices of environment 200 may interconnect via wired connections, wireless connections, or a combination of wired and wireless connections.

Client device 210 includes one or more devices capable of receiving, generating, storing, processing, and/or providing information associated with communication via the network 240. For example, client device 210 may include a communication and/or computing device, such as printer, a mobile phone (e.g., a smart phone, a radiotelephone, and/or the like), a laptop computer, a tablet computer, a handheld computer, a desktop computer, a gaming device, a wearable communication device (e.g., a smart wristwatch, a pair of smart eyeglasses, and/or the like), and/or a similar type of device.

Network device 220 includes one or more devices capable of receiving, storing, generating, processing, forwarding, and/or transferring information in a manner described herein. For example, network device 220 may include a router, a switch, a gateway, a firewall device, a modem, a hub, a bridge, a network interface controller (NIC), a reverse proxy, a server (e.g., a proxy server), a multiplexer, a security device, an intrusion detection device, a load balancer, or a similar device. In some implementations, network device 220 may be a physical device implemented within a housing, such as a chassis. In some implementations, network device 220 may be a virtual device implemented by one or more computer devices of a cloud computing environment or a data center.

Server device 230 includes one or more devices capable of storing, processing, and/or routing information, such as information described herein. In some implementations, server device 230 may include a communication interface that allows server device 230 to receive information from and/or transmit information to network device 220. In some implementations, server device 230 may be an authentication server device, such as an authentication, authorization, and accounting (AAA) server device, a remote authentication dial in user service (RADIUS) server device, and/or a similar device.

Network 240 includes one or more wired and/or wireless networks. For example, network 240 may include a cellular network (e.g., a long-term evolution (LTE) network, a code division multiple access (CDMA) network, a 3G network, a 4G network, a 5G network, another type of next generation network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3A:
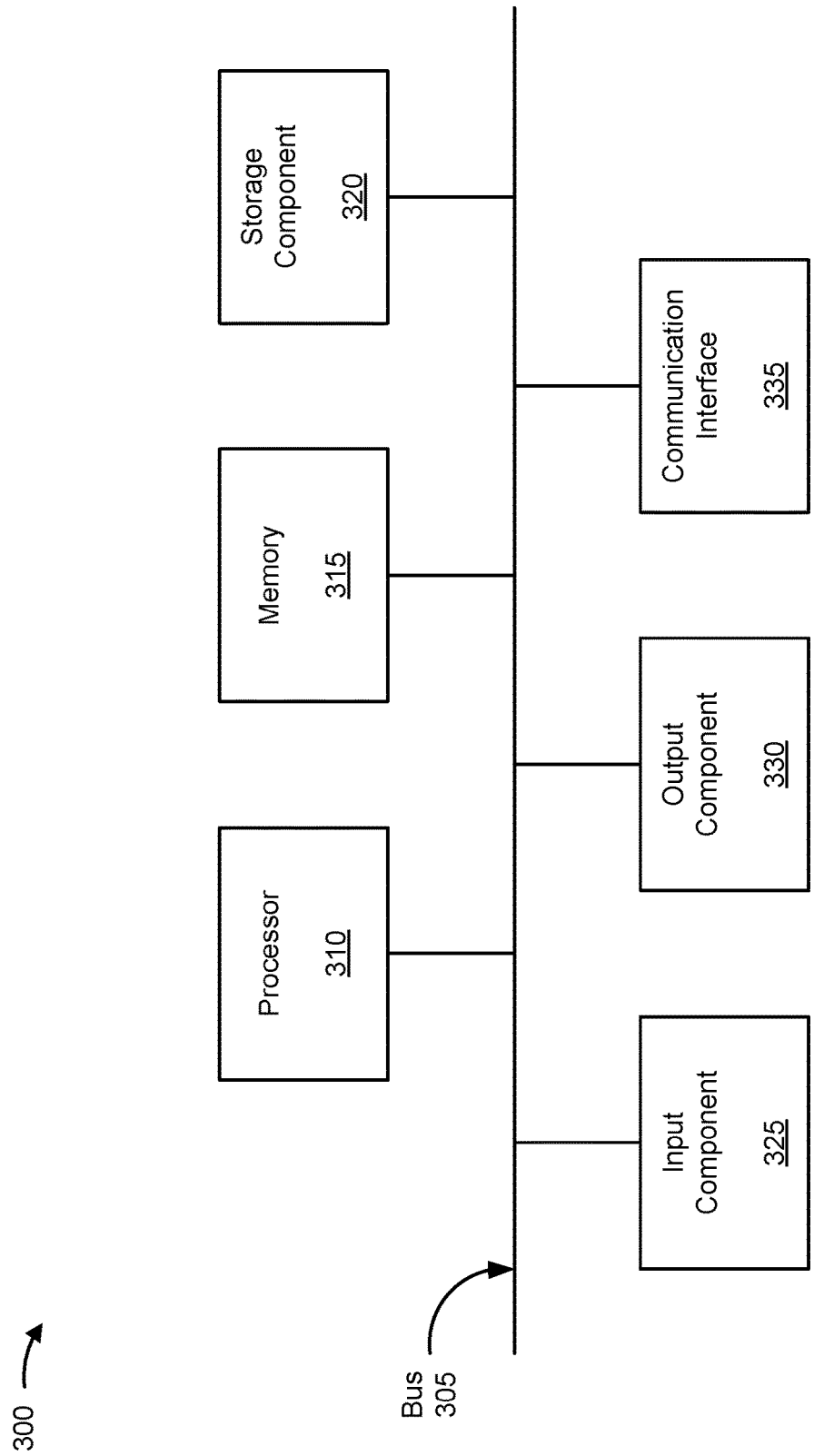
FIGS. 3A and 3B are diagrams of example components of one or more devices of FIG. 2.
Figure 3B:
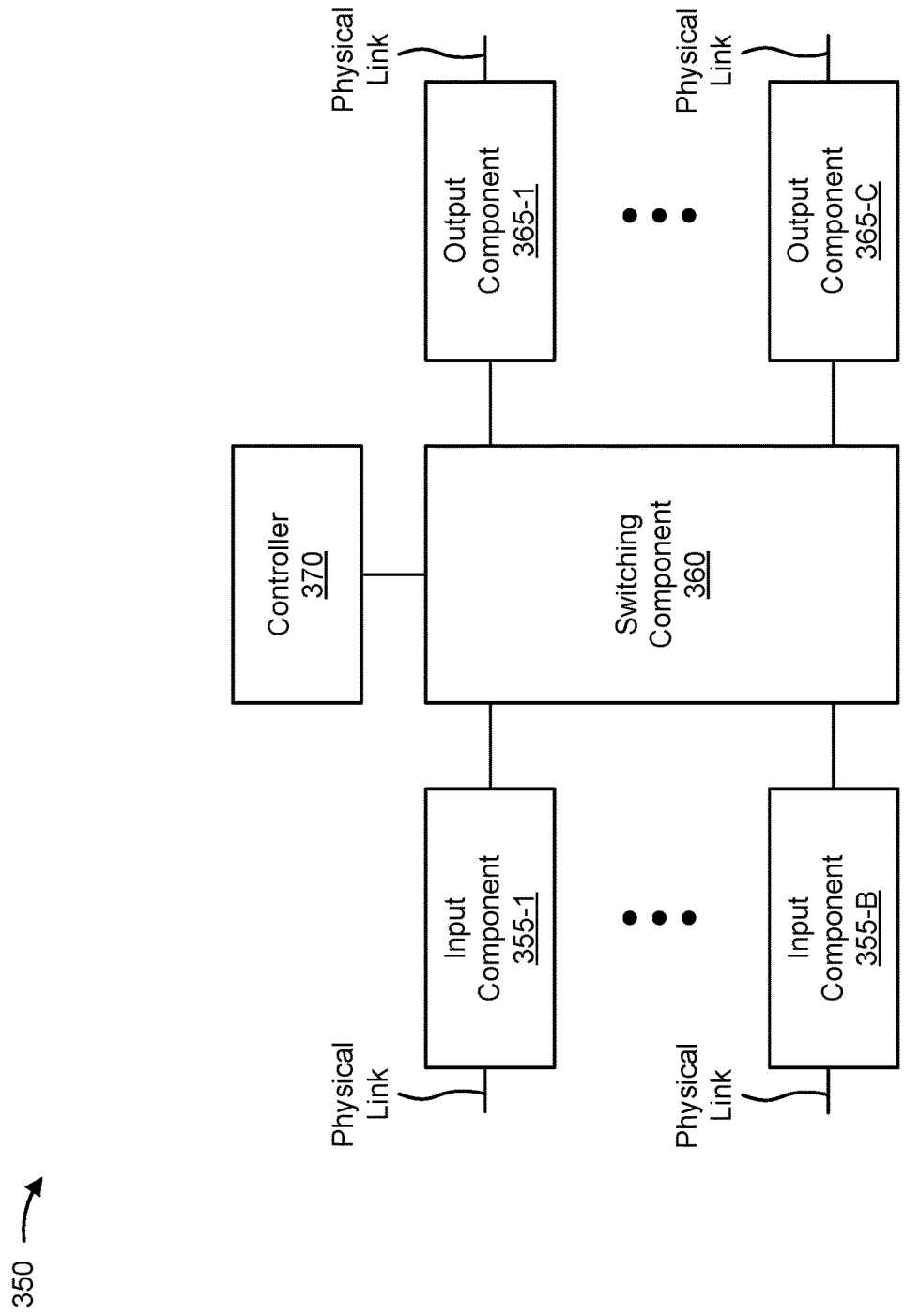

FIGS. 3A-3B are diagrams of example components of one or more devices of FIG. 2. FIG. 3A is a diagram of example components of a device 300. Device 300 may correspond to client device 210, network device 220, server device 230, and/or the like. In some implementations, client device 210, network device 220, server device 230, and/or the like may include one or more devices 300 and/or one or more components of device 300. As shown in FIG. 3A, device 300 may include a bus 305, a processor 310, a memory 315, a storage component 320, an input component 325, an output component 330, and a communication interface 335.

Bus 305 includes a component that permits communication among the components of device 300. Processor 310 is implemented in hardware, firmware, or a combination of hardware and software. Processor 310 takes the form of a central processing unit (CPU), a graphics processing unit (GPU), an accelerated processing unit (APU), a microprocessor, a microcontroller, a digital signal processor (DSP), a field-programmable gate array (FPGA), an ASIC, or another type of processing component. In some implementations, processor 310 includes one or more processors capable of being programmed to perform a function. Memory 315 includes a random access memory (RAM), a read only memory (ROM), and/or another type of dynamic or static storage device (e.g., a flash memory, a magnetic memory, and/or an optical memory) that stores information and/or instructions for use by processor 310.

Storage component 320 stores information and/or software related to the operation and use of device 300. For example, storage component 320 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 325 includes a component that permits device 300 to receive information, such as via user input (e.g., a touch screen display, a keyboard, a keypad, a mouse, a button, a switch, and/or a microphone). Additionally, or alternatively, input component 325 may include a sensor for sensing information (e.g., a global positioning system (GPS) component, an accelerometer, a gyroscope, and/or an actuator). Output component 330 includes a component that provides output information from device 300 (e.g., a display, a speaker, and/or one or more light-emitting diodes (LEDs)).

Communication interface 335 includes a transceiver-like component (e.g., a transceiver and/or a separate receiver and transmitter) that enables device 300 to communicate with other devices, such as via a wired connection, a wireless connection, or a combination of wired and wireless connections. Communication interface 335 may permit device 300 to receive information from another device and/or provide information to another device. For example, communication interface 335 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 310 executing software instructions stored by a non-transitory computer-readable medium, such as memory 315 and/or storage component 320. A computer-readable medium is defined herein as a non-transitory memory device. A memory device includes memory space within a single physical storage device or memory space spread across multiple physical storage devices.

Software instructions may be read into memory 315 and/or storage component 320 from another computer-readable medium or from another device via communication interface 335. When executed, software instructions stored in memory 315 and/or storage component 320 may cause processor 310 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3A are provided as an example. In practice, device 300 may include additional components, fewer components, different components, or differently arranged components than those shown in FIG. 3A. Additionally, or alternatively, a set of components (e.g., one or more components) of device 300 may perform one or more functions described as being performed by another set of components of device 300.

FIG. 3B is a diagram of example components of a device 350. Device 350 may correspond to network device 220, server device 230, and/or the like. In some implementations, network device 220, server device 230, and/or the like may include one or more devices 350 and/or one or more components of device 350. As shown in FIG. 3B, device 350 may include one or more input components 355-1 through 355-B (B≥1) (hereinafter referred to collectively as input components 355, and individually as input component 355), a switching component 360, one or more output components 365-1 through 365-C (C≥1) (hereinafter referred to collectively as output components 365, and individually as output component 365), and a controller 370.

Input components 355 may be points of attachment for physical links and may be points of entry for incoming traffic, such as packets. Input component 355 may process incoming traffic, such as by performing data link layer encapsulation or decapsulation. In some implementations, input component 355 may send and/or receive packets. In some implementations, input component 355 may include an input line card that includes one or more packet processing components (e.g., in the form of integrated circuits), such as one or more interface cards (IFCs), packet forwarding components, line card controller components, input ports, processors, memories, and/or input queues. In some implementations, device 350 may include one or more input components 355.

Switching component 360 may interconnect input components 355 with output components 365. In some implementations, switching component 360 may be implemented via one or more crossbars, via busses, and/or with shared memories. The shared memories may act as temporary buffers to store packets from input components 355 before the packets are eventually scheduled for delivery to output components 365. In some implementations, switching component 360 may enable input components 355, output components 365, and/or controller 370 to communicate.

Output component 365 may store packets and may schedule packets for transmission on output physical links. Output component 365 may support data link layer encapsulation or decapsulation, and/or a variety of higher-level protocols. In some implementations, output component 365 may send packets and/or receive packets. In some implementations, output component 365 may include an output line card that includes one or more packet processing components (e.g., in the form of integrated circuits), such as one or more IFCs, packet forwarding components, line card controller components, output ports, processors, memories, and/or output queues. In some implementations, device 350 may include one or more output components 365. In some implementations, input component 355 and output component 365 may be implemented by the same set of components (e.g., and input/output component may be a combination of input component 355 and output component 365).

Controller 370 includes a processor in the form of, for example, a CPU, a GPU, an APU, a microprocessor, a microcontroller, a DSP, an FPGA, an ASIC, and/or another type of processor. The processor is implemented in hardware, firmware, or a combination of hardware and software. In some implementations, controller 370 may include one or more processors that can be programmed to perform a function.

In some implementations, controller 370 may include a RAM, a ROM, and/or another type of dynamic or static storage device (e.g., a flash memory, a magnetic memory, an optical memory, etc.) that stores information and/or instructions for use by controller 370.

In some implementations, controller 370 may communicate with other devices, networks, and/or systems connected to device 300 to exchange information regarding network topology. Controller 370 may create routing tables based on the network topology information, create forwarding tables based on the routing tables, and forward the forwarding tables to input components 355 and/or output components 365. Input components 355 and/or output components 365 may use the forwarding tables to perform route lookups for incoming and/or outgoing packets.

Controller 370 may perform one or more processes described herein. Controller 370 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 370 from another computer-readable medium or from another device via a communication interface. When executed, software instructions stored in a memory and/or storage component associated with controller 370 may cause controller 370 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3B are provided as an example. In practice, device 350 may include additional components, fewer components, different components, or differently arranged components than those shown in FIG. 3B. Additionally, or alternatively, a set of components (e.g., one or more components) of device 350 may perform one or more functions described as being performed by another set of components of device 350.

Figure 4:
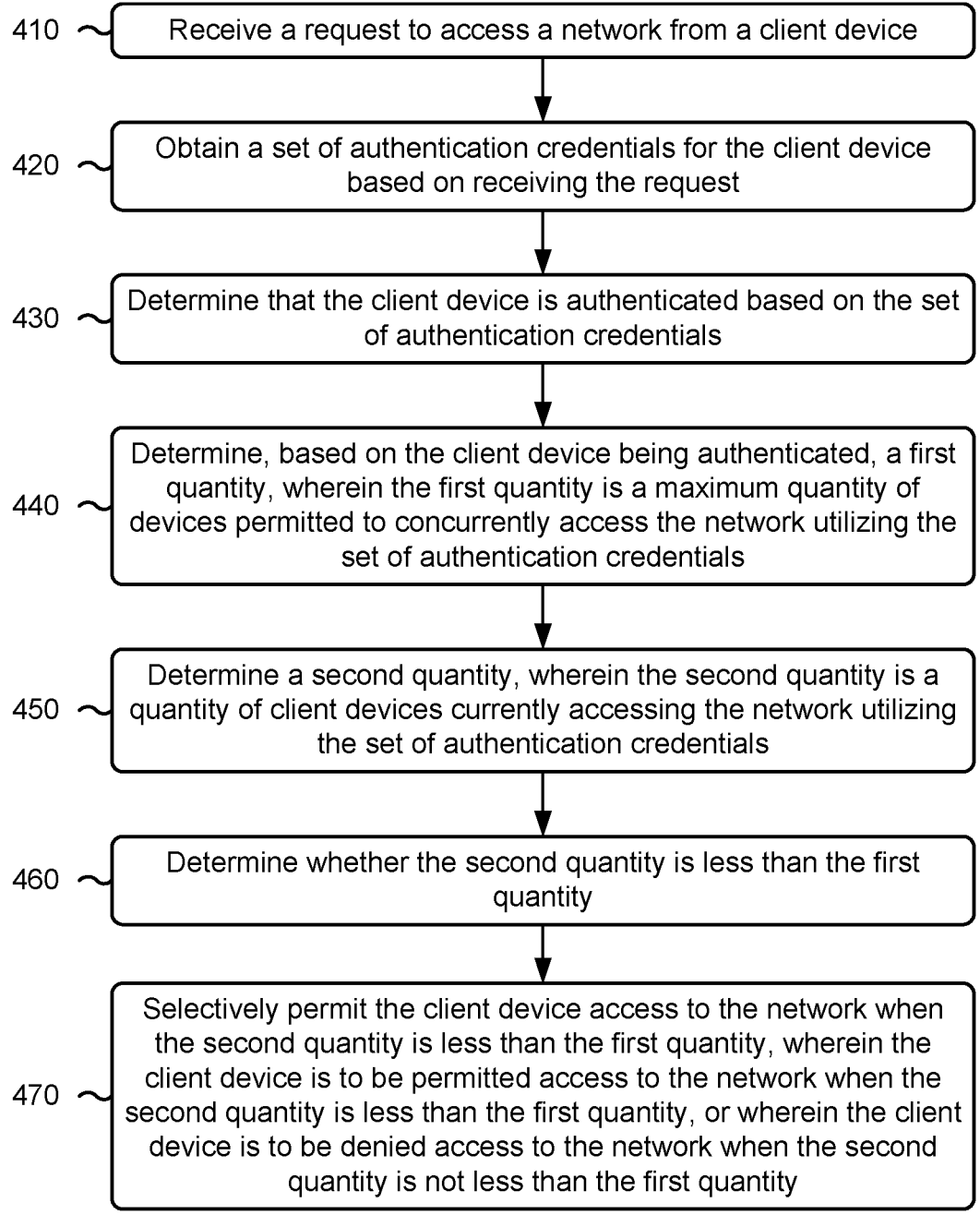

FIG. 4 is a flow chart of an example process 400 for controlling access to a network based on a maximum device restriction. In some implementations, one or more process blocks of FIG. 4 may be performed by a network device (e.g., network device 220). In some implementations, one or more process blocks of FIG. 4 may be performed by another device or a group of devices separate from or including the network device, such as a server device (e.g., server device 230) and/or the like.

As shown in FIG. 4, process 400 may include receiving a request to access a network from a client device (block 410). For example, the network device (e.g., using processor 310, memory 315, storage component 320, input component 325, output component 330, communication interface 335, input component 355, switching component 360, output component 365, controller 370, and/or the like) may receive a request to access a network from a client device, as described above.

As further shown in FIG. 4, process 400 may include obtaining a set of authentication credentials for the client device based on receiving the request (block 420). For example, the network device (e.g., using processor 310, memory 315, storage component 320, input component 325, output component 330, communication interface 335, input component 355, switching component 360, output component 365, controller 370, and/or the like) may obtain a set of authentication credentials for the client device based on receiving the request, as described above.

As further shown in FIG. 4, process 400 may include determining that the client device is authenticated based on the set of authentication credentials (block 430). For example, the network device (e.g., using processor 310, memory 315, storage component 320, input component 325, output component 330, communication interface 335, input component 355, switching component 360, output component 365, controller 370, and/or the like) may determine that the client device is authenticated based on the set of authentication credentials, as described above.

As further shown in FIG. 4, process 400 may include determining, based on the client device being authenticated, a first quantity, wherein the first quantity is a maximum quantity of devices permitted to concurrently access the network utilizing the set of authentication credentials (block 440). For example, the network device (e.g., using processor 310, memory 315, storage component 320, input component 325, output component 330, communication interface 335, input component 355, switching component 360, output component 365, controller 370, and/or the like) may determine, based on the client device being authenticated, a first quantity, as described above. In some implementations, the first quantity is a maximum quantity of devices permitted to concurrently access the network utilizing the set of authentication credentials.

As further shown in FIG. 4, process 400 may include determining a second quantity, wherein the second quantity is a quantity of client devices currently accessing the network utilizing the set of authentication credentials (block 450). For example, the network device (e.g., using processor 310, memory 315, storage component 320, input component 325, output component 330, communication interface 335, input component 355, switching component 360, output component 365, controller 370, and/or the like) may determine a second quantity, as described above. In some implementations, the second quantity is a quantity of client devices currently accessing the network utilizing the set of authentication credentials.

As further shown in FIG. 4, process 400 may include determining whether the second quantity is less than the first quantity (block 460). For example, the network device (e.g., using processor 310, memory 315, storage component 320, input component 325, output component 330, communication interface 335, input component 355, switching component 360, output component 365, controller 370, and/or the like) may determine whether the second quantity is less than the first quantity, as described above.

As further shown in FIG. 4, process 400 may include selectively permitting the client device access to the network based on whether the second quantity is less than the first quantity, wherein the client device is to be permitted access to the network when the second quantity is less than the first quantity, or wherein the client device is to be denied access to the network when the second quantity is not less than the first quantity (block 470). For example, the network device (e.g., using processor 310, memory 315, storage component 320, input component 325, output component 330, communication interface 335, input component 355, switching component 360, output component 365, controller 370, and/or the like) may selectively permit, by the network device, the client device access to the network based on whether the second quantity is less than the first quantity, as described above. In some implementations, the client device is to be permitted access to the network when the second quantity is less than the first quantity. In some implementations, the client device is to be denied access to the network when the second quantity is not less than the first quantity.

Process 400 may include additional implementations, such as any single implementation or any combination of implementations described below and/or in connection with one or more other processes described elsewhere herein.

In a first implementation, the second quantity is less than the first quantity, the method further comprising: increasing the second quantity based on permitting the client device access to the network. For example, the network device may determine that the second quantity is less than the first quantity. The network device may increase the second quantity based on permitting the client device to access the network, as described above.

In a second implementation, alone or in combination with the first implementation, process 400 includes determining that a connection between the client device and the network has been terminated; and decreasing the second quantity based on the connection being terminated. For example, the network device may determine that a connection between the client device and the network device has been terminated. The network device may decrease the second quantity based on the connection being terminated, as described above.

In a third implementation, alone or in combination with one or more of the first and second implementations, process 400 includes generating a security alert when the second quantity is not less than the first quantity. For example, the network device may generate a security alert when the second quantity is not less than the first quantity, as described above.

In a fourth implementation, alone or in combination with one or more of the first through third implementations, the first quantity is a maximum quantity of the type of device permitted to concurrently access the network utilizing the set of authentication credentials, and the second quantity is a quantity of the type of device currently accessing the network utilizing the set of authentication credentials.

In a fifth implementation, alone or in combination with one or more of the first through fourth implementations, determining that the client device is authenticated includes: transmitting the set of authentication credentials to a server device; receiving a response from the server device, and determining that the client device is authenticated based on the response. For example, when determining that the client device is authenticated, the network device may transmit the set of authentication credentials to a server device, may receive a response from the server device, and may determine that the client device is authenticated based on the response, as described above.

In a sixth implementation, alone or in combination with one or more of the first through fifth implementations, determining the first quantity includes: receiving information identifying the first quantity from a server device. For example, when determining the first quantity, the network device may receive information identifying the first quantity from a server device, as described above.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
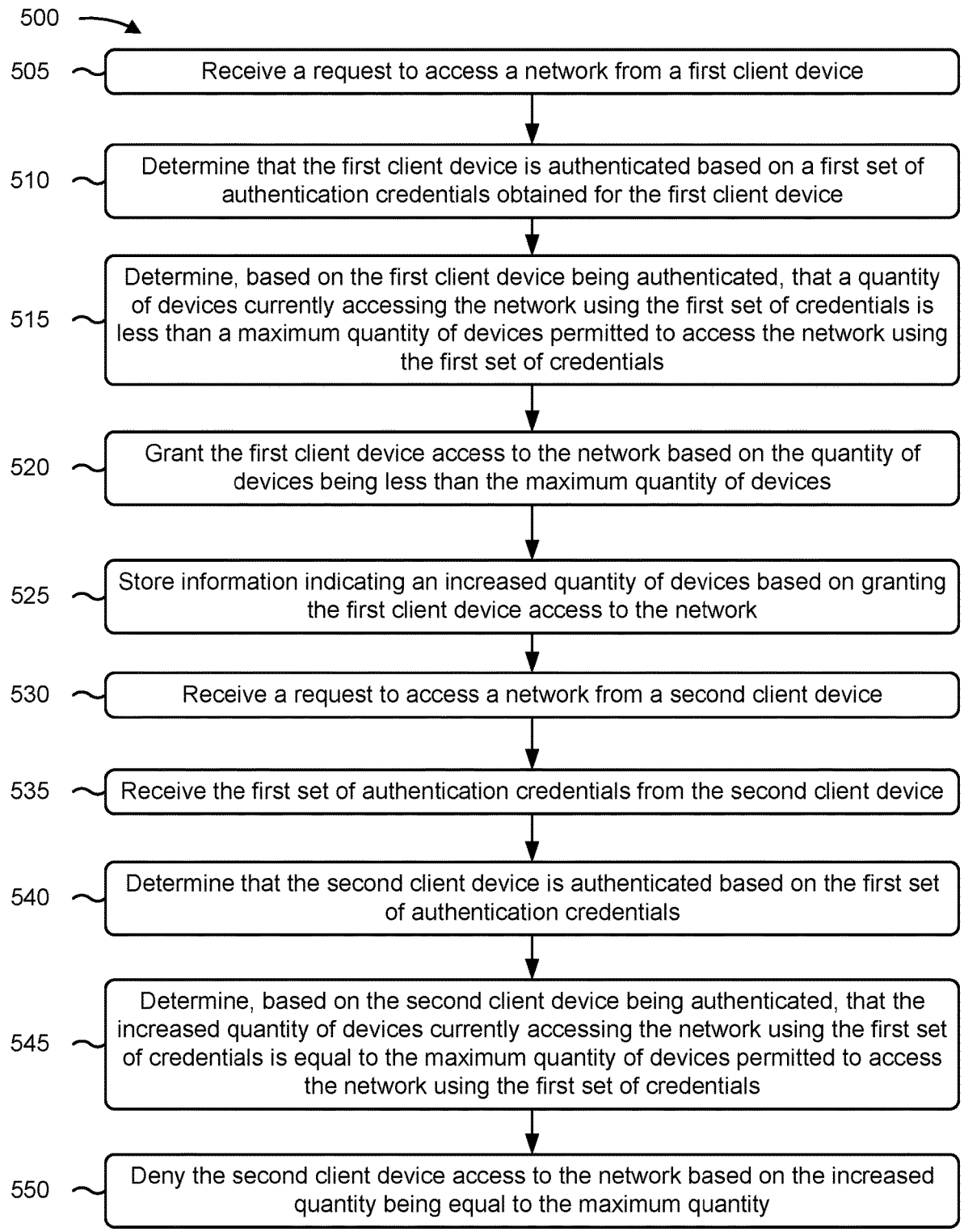

FIG. 5 is a flow chart of an example process 500 for controlling access to a network based on a maximum device access restriction. In some implementations, one or more process blocks of FIG. 5 may be performed by a network device (e.g., network device 220). In some implementations, one or more process blocks of FIG. 5 may be performed by another device or a group of devices separate from or including the network device, such as a server device (e.g., server device 230 and/or the like.

As shown in FIG. 5, process 500 may include receiving a request to access a network from a first client device (block 505). For example, the network device (e.g., using processor 310, memory 315, storage component 320, input component 325, output component 330, communication interface 335, input component 355, switching component 360, output component 365, controller 370, and/or the like) may receive a request to access a network from a first client device, as described above.

As further shown in FIG. 5, process 500 may include determining that the first client device is authenticated based on a first set of authentication credentials obtained for the first client device (block 510). For example, the network device (e.g., using processor 310, memory 315, storage component 320, input component 325, output component 330, communication interface 335, input component 355, switching component 360, output component 365, controller 370, and/or the like) may determine that the first client device is authenticated based on a first set of authentication credentials obtained for the first client device, as described above.

As further shown in FIG. 5, process 500 may include determining, based on the first client device being authenticated, that a quantity of devices currently accessing the network using the first set of credentials is less than a maximum quantity of devices permitted to access the network using the first set of credentials (block 515). For example, the network device (e.g., using processor 310, memory 315, storage component 320, input component 325, output component 330, communication interface 335, input component 355, switching component 360, output component 365, controller 370, and/or the like) may determine, based on the first client device being authenticated, that a quantity of devices currently accessing the network using the first set of credentials is less than a maximum quantity of devices permitted to access the network using the first set of credentials, as described above.

As further shown in FIG. 5, process 500 may include granting the first client device access to the network based on the quantity of devices being less than the maximum quantity of devices (block 520). For example, the network device (e.g., using processor 310, memory 315, storage component 320, input component 325, output component 330, communication interface 335, input component 355, switching component 360, output component 365, controller 370, and/or the like) may grant the first client device access to the network based on the quantity of devices being less than the maximum quantity of devices, as described above.

As further shown in FIG. 5, process 500 may include store information indicating an increased quantity of devices based on granting the first client device access to the network (block 525). For example, the network device (e.g., using processor 310, memory 315, storage component 320, input component 325, output component 330, communication interface 335, input component 355, switching component 360, output component 365, controller 370, and/or the like) may increase the quantity of devices, to form an increased quantity of devices, based on granting the first client device access to the network, as described above.

As further shown in FIG. 5, process 500 may include receiving a request to access a network from a second client device (block 530). For example, the network device (e.g., using processor 310, memory 315, storage component 320, input component 325, output component 330, communication interface 335, input component 355, switching component 360, output component 365, controller 370, and/or the like) may receive a request to access a network from a second client device, as described above.

As further shown in FIG. 5, process 500 may include receiving the first set of authentication credentials from the second client device (block 535). For example, the network device (e.g., using processor 310, memory 315, storage component 320, input component 325, output component 330, communication interface 335, input component 355, switching component 360, output component 365, controller 370, and/or the like) may receive the first set of authentication credentials from the second client device, as described above.

As further shown in FIG. 5, process 500 may include determining that the second client device is authenticated based on the first set of authentication credentials (block 540). For example, the network device (e.g., using processor 310, memory 315, storage component 320, input component 325, output component 330, communication interface 335, input component 355, switching component 360, output component 365, controller 370, and/or the like) may determine that the second client device is authenticated based on the first set of authentication credentials, as described above.

As further shown in FIG. 5, process 500 may include determining, based on the second client device being authenticated, that the increased quantity of devices currently accessing the network using the first set of credentials is equal to the maximum quantity of devices permitted to access the network using the first set of credentials (block 545). For example, the network device (e.g., using processor 310, memory 315, storage component 320, input component 325, output component 330, communication interface 335, input component 355, switching component 360, output component 365, controller 370, and/or the like) may determine, based on the second client device being authenticated, that the increased quantity of devices currently accessing the network using the first set of credentials is equal to the maximum quantity of devices permitted to access the network using the first set of credentials, as described above.

As further shown in FIG. 5, process 500 may include denying the second client device access to the network based on the increased quantity being equal to the maximum quantity (block 550). For example, the network device (e.g., using processor 310, memory 315, storage component 320, input component 325, output component 330, communication interface 335, input component 355, switching component 360, output component 365, controller 370, and/or the like) may deny the second client device access to the network based on the increased quantity being equal to the maximum quantity, as described above.

Process 500 may include additional implementations, such as any single implementation or any combination of implementations described below and/or in connection with one or more other processes described elsewhere herein.

In a first implementation, process 500 includes transmitting a message to the second client device indicating that a maximum quantity of devices utilizing the first set of authentication credentials are currently accessing the network. For example, the network device may transmit a message to the second client device indicating that a maximum quantity of devices utilizing the first set of authentication credentials are currently accessing the network, as described above.

In a second implementation, alone or in combination with the first implementation, process 500 includes transmitting the first set of authentication credentials to a server device; receiving, from the server device, a response indicating that the first client device is authorized to access the network; and determining that the first client device is authenticated based on the response. For example, the network device may transmit the first set of authentication credentials to a server device, may receive, from the server device, a response indicating that the first client device is authorized to access the network, and may determine that the first client device is authenticated based on the response, as described above.

In a third implementation, alone or in combination with one or more of the first and second implementations, process 500 includes receiving a vendor service attribute from a server device; and determining the maximum quantity of devices permitted to access the network using the first set of authentication credentials based on the vendor service attribute. For example, the network device may receive a vendor service attribute from a server device and may determine the maximum quantity of devices permitted to access the network using the first set of credentials based on the vendor service attribute, as described above.

In a fourth implementation, alone or in combination with one or more of the first through third implementations, process 500 includes performing a process for aging out a media access control (MAC) address associated with the first client device; and reducing the increased quantity of devices based on performing the process. For example, the network device may perform a process for aging out a MAC address associated with the first client and may reduce the increased quantity of devices based on performing the process, as described above.

In a fifth implementation, alone or in combination with one or more of the first through fourth implementations, process 500 includes determining an occurrence of a session timeout associated with the first client device; and storing information indicating a decrease in the increased quantity of devices based on the occurrence of the session timeout. For example, the network device may determine an occurrence of a session timeout associated with the first client device and may store information indicating a decrease in the increased quantity of devices based on the occurrence of the session timeout, as described above.

In a sixth implementation, alone or in combination with one or more of the first through fifth implementations, process 500 includes determining an occurrence of an authentication timeout associated with the first client device; and storing information indicating a decrease in the increased quantity of devices based on the occurrence of the authentication timeout. For example, the network device may determine an occurrence of an authentication timeout associated with the first client device and may store information indicating a decrease in the increased quantity of devices based on the occurrence of the authentication timeout, as described above.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a flow chart of an example process 600 for controlling access to a network based on a maximum device access restriction. In some implementations, one or more process blocks of FIG. 6 may be performed by a network device (e.g., network device 220). In some implementations, one or more process blocks of FIG. 6 may be performed by another device or a group of devices separate from or including the network device, such as a server device (e.g., server device 230) and/or the like.

As shown in FIG. 6, process 600 may include receiving a request to access a network from a client device (block 610). For example, the network device (e.g., using processor 310, memory 315, storage component 320, input component 325, output component 330, communication interface 335, input component 355, switching component 360, output component 365, controller 370, and/or the like) may receive a request to access a network from a client device, as described above.

As further shown in FIG. 6, process 600 may include determining that the client device is authenticated based on a set of authentication credentials obtained for the client device (block 620). For example, the network device (e.g., using processor 310, memory 315, storage component 320, input component 325, output component 330, communication interface 335, input component 355, switching component 360, output component 365, controller 370, and/or the like) may determine that the client device is authenticated based on a set of authentication credentials obtained for the client device, as described above.

As further shown in FIG. 6, process 600 may include determining, based on the client device being authenticated, that a quantity of devices currently accessing the network using the set of authentication credentials is equal to a maximum quantity of devices permitted to access the network using the set of authentication credentials (block 630). For example, the network device (e.g., using processor 310, memory 315, storage component 320, input component 325, output component 330, communication interface 335, input component 355, switching component 360, output component 365, controller 370, and/or the like) may determine, based on the client device being authenticated, that a quantity of devices currently accessing the network using the set of authentication credentials is equal to a maximum quantity of devices permitted to access the network using the set of authentication credentials, as described above.

As further shown in FIG. 6, process 600 may include denying the client device access to the network based on the quantity of devices being equal to the maximum quantity of device (block 640). For example, the network device (e.g., using processor 310, memory 315, storage component 320, input component 325, output component 330, communication interface 335, input component 355, switching component 360, output component 365, controller 370, and/or the like) may deny the client device access to the network based on the quantity of devices being equal to the maximum quantity of device, as described above.

Process 600 may include additional implementations, such as any single implementation or any combination of implementations described below and/or in connection with one or more other processes described elsewhere herein.

In a first implementation, process 600 includes terminating a communication session associated with a device utilizing the set of authentication credentials to access the network; and storing information indicating a decrease in the quantity of devices currently accessing the network utilizing the set of authentication credentials based on terminating the communication session. For example, the network device may terminate a communication session associated with a device utilizing the set of authentication credentials to access the network and may store information indicating a decrease in the quantity of devices currently accessing the network utilizing the set of authentication credentials based on terminating the communication session, as described above.

In a second implementation, alone or in combination with the first implementation, process 600 includes transmitting the set of authentication credentials to a server device, wherein is transmitting the set of authentication credentials to the server device causes the server device to perform a process for authenticating the client device based on the set of authentication credentials; receiving, from the server device, information indicating that the client device is authenticated; and determining that the client device is authenticated based on the information. For example, the network device may transmit the set of authentication credentials to a server device. Transmitting the set of authentication credentials to the server device may cause the server device to perform a process for authenticating the client device based on the set of authentication credentials. The network device may receive, from the server device, information indicating that the client device is authenticated and may determine that the client device is authenticated based on the information, as described above.

In a third implementation, alone or in combination with one or more of the first and second implementations, process 600 includes receiving information identifying the maximum quantity of devices from an authentication, authorization, and accounting (AAA) server. For example, the network device may receive information identifying the maximum quantity of devices from an AAA server, as described above.

In a fourth implementation, alone or in combination with one or more of the first through third implementations, process 600 includes accessing a user profile is associating with a user of the client device; and determining the maximum quantity of devices permitted to access the network using the set of authentication credentials based on the user profile. For example, the network device may access a user profile is associating with a user of the client device and may determine the maximum quantity of devices permitted to access the network using the set of authentication credentials based on the user profile, as described above.

In a fifth implementation, alone or in combination with one or more of the first through fourth implementations, process 600 includes accessing account information associated with the set of authentication credentials; and determining the maximum quantity of devices permitted to access the network using the set of authentication credentials based on the account information. For example, the network device may access account information associated with the set of authentication credentials and may determine the maximum quantity of devices permitted to access the network using the set of authentication credentials based on the account information, as described above.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, and/or a combination of hardware and software.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
receiving, by a network device, a request to access a network from a client device;
obtaining, by the network device, a set of authentication credentials for the client device based on receiving the request,
wherein the set of authentication credentials includes one or more of:
a security certificate,
a security token, or
a biometric;
determining, by the network device, that the client device is authenticated based on a type of device and based on the set of authentication credentials,
wherein determining that the client device is authenticated comprises:
sending, by the network device and to a server device, an authentication response, and
receiving, by the network device and from the server device, an authentication acceptance message that includes information indicating that the set of authentication credentials are accepted;
determining, by the network device and based on the client device being authenticated, a first quantity,
wherein the first quantity identifies a maximum quantity of the type of device permitted to concurrently access the network utilizing a same authentication credential of the set of authentication credentials;
determining, by the network device, a second quantity,
wherein the second quantity identifies a quantity of the type of device currently accessing the network utilizing the set of authentication credentials;
determining, by the network device, whether the second quantity is less than the first quantity; and
selectively permitting, by the network device, the client device access to the network based on whether the second quantity is less than the first quantity,
wherein the client device is to be permitted access to the network when the second quantity is less than the first quantity,
wherein the client device is to be denied access to the network when the second quantity is not less than the first quantity.

2. The method of claim 1, wherein the second quantity is less than the first quantity, the method further comprising:
increasing the second quantity based on permitting the client device access to the network.

3. The method of claim 2, further comprising:
determining that a connection between the client device and the network has been terminated; and
decreasing the second quantity based on the connection being terminated.

4. The method of claim 1, further comprising:
generating a security alert when the second quantity is not less than the first quantity.

5. The method of claim 1, wherein determining the first quantity includes:
receiving information identifying the first quantity from the server device,
wherein the first quantity is set to one.

6. The method of claim 1, wherein the server device is an authentication server device.

7. The method of claim 1, wherein the maximum quantity of the type of device is different than a maximum quantity of a different type of device.

8. A network device, comprising:
one or more memories; and
one or more processors to:
receive a request to access a network from a first client device;
determine that the first client device is authenticated based on a type of device and based on a first set of authentication credentials obtained for the first client device,
wherein the first set of authentication credentials includes one or more of:
a security certificate,
a security token, or
a biometric,
wherein the one or more processors, when determining that the first client device is authenticated, are to:
send, by the network device and to a server device, an authentication response, and
receive, by the network device and from the server device, an authentication acceptance message that includes information indicating that the first set of authentication credentials are accepted;
determine, based on the first client device being authenticated, that a quantity of the type of device currently accessing the network using a same authentication credential of the first set of authentication credentials is less than a maximum quantity of the type of device permitted to access the network using the first set of authentication credentials;
grant the first client device access to the network based on the quantity of the type of device being less than the maximum quantity of the type of device;
store information indicating an increased quantity of devices based on granting the first client device access to the network;
receive a request to access the network from a second client device;
receive the first set of authentication credentials from the second client device;
determine that the second client device is authenticated based on the first set of authentication credentials;
determine, based on the second client device being authenticated, that the increased quantity of devices currently accessing the network using the first set of authentication credentials is equal to the maximum quantity of devices permitted to access the network using the first set of authentication credentials; and
deny the second client device access to the network based on the increased quantity being equal to the maximum quantity.

9. The network device of claim 8, wherein the one or more processors are further to:
transmit a message to the second client device indicating that a maximum quantity of devices utilizing the first set of authentication credentials are currently accessing the network.

10. The network device of claim 8, wherein the one or more processors are further to:
receive a vendor service attribute from the server device; and determine the maximum quantity of the type of device permitted to access the network using the first set of authentication credentials based on the vendor service attribute.

11. The network device of claim 8, wherein the one or more processors are further to:
perform a process for aging out a media access control (MAC) address associated with the first client device; and
reduce the increased quantity of devices based on performing the process.

12. The network device of claim 8, wherein the one or more processors are to:
determine an occurrence of a session timeout associated with the first client device; and
store information indicating a decrease in the increased quantity of devices based on the occurrence of the session timeout.

13. The network device of claim 8, wherein the one or more processors are to:
determine an occurrence of an authentication timeout associated with the first client device; and
store information indicating a decrease in the increased quantity of devices based on the occurrence of the authentication timeout.

14. The network device of claim 8, wherein the server device is an authentication server device.

15. A non-transitory computer-readable medium storing instructions, the instructions comprising:
one or more instructions that, when executed by one or more processors, cause the one or more processors to:
receive a request to access a network from a client device;
determine that the client device is authenticated based on a type of device and based on a set of authentication credentials obtained for the client device,
wherein the set of authentication credentials includes one or more of:
a security certificate,
a security token, or
a biometric,
wherein the one or more instructions, that cause the one or more processors to determine that the client device is authenticated, cause the one or more processors to:
send, to a server device, an authentication response, and
receive, from the server device, an authentication acceptance message that includes information indicating that the set of authentication credentials are accepted;
determine, based on the client device being authenticated, that a quantity of the type of device currently accessing the network using a same authentication credential of the set of authentication credentials is equal to a maximum quantity of the type of device permitted to access the network using the set of authentication credentials; and
deny the client device access to the network based on the quantity of the type of device being equal to the maximum quantity of the type of device.

16. The non-transitory computer-readable medium of claim 15, wherein the one or more instructions, when executed by the one or more processors, further cause the one or more processors to:
terminate a communication session associated with a device utilizing the set of authentication credentials to access the network; and
store information indicating a decrease of the quantity of devices currently accessing the network utilizing the set of authentication credentials based on terminating the communication session.

17. The non-transitory computer-readable medium of claim 15, wherein the one or more instructions, that cause the one or more processors to determine that the quantity of devices currently accessing the network using the set of authentication credentials is equal to the maximum quantity of devices permitted to access the network using the set of authentication credentials, cause the one or more processors to:
receive information identifying the maximum quantity of devices from the server device.

18. The non-transitory computer-readable medium of claim 15, wherein the one or more instructions, that cause the one or more processors to determine that the quantity of devices currently accessing the network using the set of authentication credentials is equal to the maximum quantity of devices permitted to access the network using the set of authentication credentials, cause the one or more processors to:
access a user profile associated with a user of the client device; and
determine the maximum quantity of devices permitted to access the network using the set of authentication credentials based on the user profile.

19. The non-transitory computer-readable medium of claim 15, wherein the one or more instructions, that cause the one or more processors to determine that the quantity of devices currently accessing the network using the set of authentication credentials is equal to the maximum quantity of devices permitted to access the network using the set of authentication credentials, cause the one or more processors to:
access account information associated with the set of authentication credentials; and
determine the maximum quantity of devices permitted to access the network using the set of authentication credentials based on the account information.

20. The non-transitory computer-readable medium of claim 15, wherein the server device is an authentication, authorization, and accounting (AAA) server device.

* * * * *